March 29, 1966  D. KEEN ETAL  3,242,760
BRAKE CONTROL MECHANISM

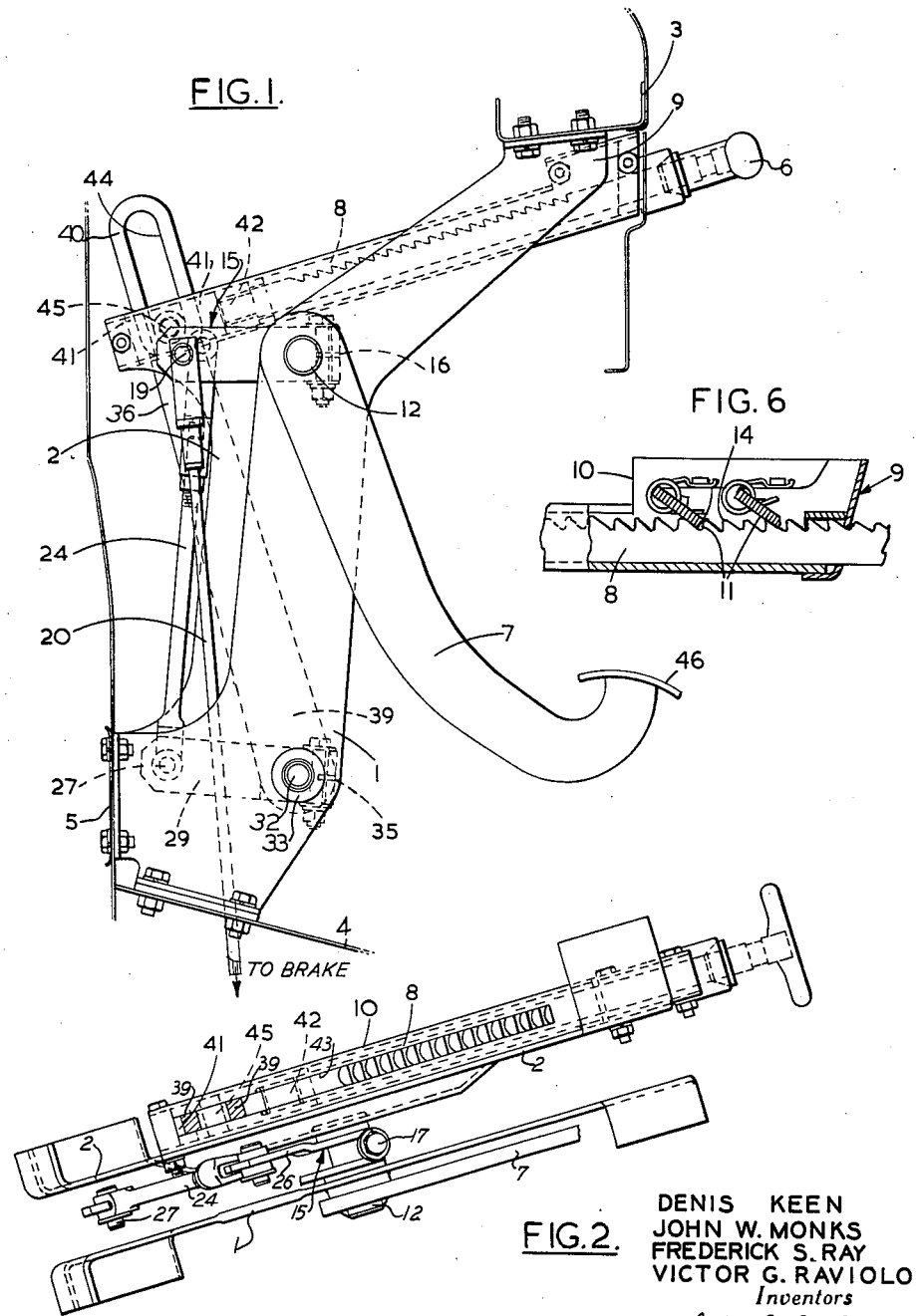

Filed Oct. 2, 1963  2 Sheets-Sheet 2

DENIS KEEN
JOHN W. MONKS
FREDERICK S. RAY
VICTOR G. RAVIOLO
*Inventors*

By *John R. Faulkner*
*Clifford L. Sadler*

*Attorneys*

United States Patent Office

3,242,760
Patented Mar. 29, 1966

3,242,760
BRAKE CONTROL MECHANISM
Denis Keen, Romford, Essex, John W. Monks and Frederick S. Ray, Upminister, Essex, and Victor G. Raviolo, London, England, assignors to Ford Motor Company, Dearborn, Mich., a corporation of Delaware
Filed Oct. 2, 1963, Ser. No. 313,372
Claims priority, application Great Britain, Nov. 15, 1962, 43,162/62
6 Claims. (Cl. 74—481)

The present invention relates generally to actuating devices and more particularly, to mechanical actuators for motor vehicle brake systems.

It is not uncommon in current automobiles and trucks to provide a foot operated mechanical parking brake, in addition to the conventional foot operated hydraulic service brakes. Foot actuation of a parking brake has an advantage over the older manually actuated mechanism in that greater applying force is available. The hand operated parking brake control has the advantage, however, of facilitating the starting of a vehicle on a hill because the brakes can be released gradually. This is important in a manual transmission vehicle where both feet are usually occupied with the accelerator and clutch pedal controls.

In accordance with a desire for increased vehicle operating safety and convenience, the present invention provides both a combined manual and pedal brake actuating system in which the brakes may be applied by either the hand or the foot and in which the brakes are released by a hand operation. With an embodiment of this invention, the parking brake may be gradually released when starting on a hill.

A full understanding of the many advantages and construction features of a preferred embodiment of this invention will be fully comprehended from the following discussion and accompanying drawings, in which:

FIGURE 1 is a side elevational view of a brake control mechanism according to the present invention;

FIGURE 2 is a plan view of the mechanism of FIGURE 1 with some parts omitted for the sake of clarity;

FIGURE 6 is a sectional view showing a portion of the releasable mechanism for the brake.

Figure 3:
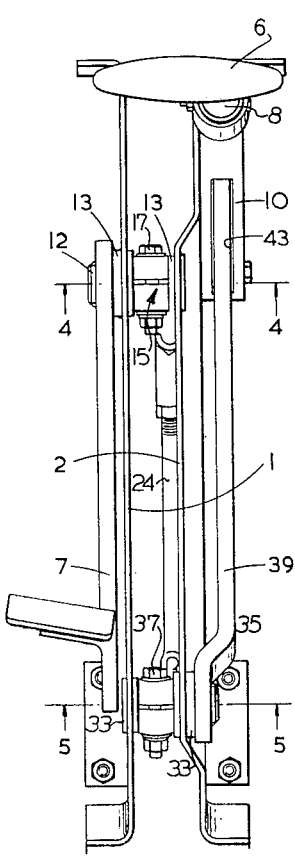
FIGURE 3 is a rear elevation of a part of the mechanism.
Figure 4:
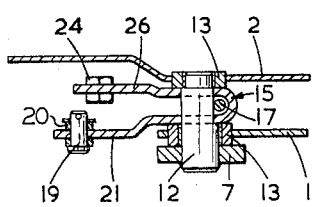
FIGURE 4 is a sectional view taken along section lines 4—4 of FIGURE 3.
Figure 5:
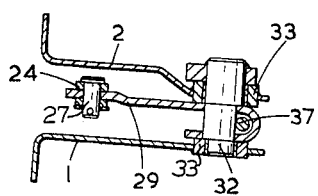
FIGURE 5 is a sectional view taken along section lines 5—5 of FIGURE 3.

Referring now to the drawings for a better understanding of this invention and in which the presently preferred embodiment is disclosed, FIGURE 1 illustrates a combined manual and pedal actuated brake control mechanism installed in a vehicle body. The brake control mechanism of FIGURE 1 is mounted on a support structure comprising spaced apart side support plates 1 and 2. The plates 1 and 2 are fixed at their upper end to dashboard or instrument panel sheet metal 3 and at their lower end to a floor pan 4 and a fire wall 5, all of the vehicle body.

A foot pedal 7 is secured to a pivot pin 12 that is rotatably mounted in bearing 13 seated in the side plates 1 and 2. The pivot pin 12 passes through aligned apertures in a U-shaped member 15. The member 15 has a slot 16 in the base thereof which extends to the aligned apertures. A bolt 17 passes through the bight of the member 15 and is tightened to close the slot 16 so that the edges of the aligned apertures grip the pin 12. The U-shaped member 15 provides the shaft or pivot pin 12 with leg portions 21 and 26 that extend forwardly therefrom. A Bowden wire cable 20 has a clevice at its upper end which is pivotally connected by a pin 19 to the end of the leg 21 of member 15. The other end of the cable 20 is connected to a mechanical vehicle brake system in a conventional manner.

With this construction, when the pedal 7 is depressed the pin 12 is rotated in the bearings 13 and since the U-shaped member 15 is clamped to it, leg 21 rotates to pull the cable 20 upwardly and apply the brakes.

A hand control actuator for the brake system is also provided. A tubular housing 10 is secured to the right-hand support plate 2 and passes through a portion of the instrument panel 3 to which it is secured. The housing 10 contains a rod 8 having a series of ratchet teeth along one longitudinal surface thereof. A handle 6 is secured to the outer end of the rod 8. A releasable mechanism is housed within the portion indicated by the reference numeral 9. The mechanism 9 may be of the double pawl type such as shown in Patents 2,543,509 and 2,543,510 and cooperates with the notched rod 8 in the fashion described in those patents.

When the rod 8 is pulled outwardly, spring pressed pawls 11 within the mechanism 9 engage the ratchet teeth 14 and hold the rod 8 in an extended position. By twisting the handle 6 approximately 90°, the pawls 11 become disengaged from the teeth 14 and the rod 8 may be pushed forwardly. Due to the manner in which the rod 8 and mechanism 9 cooperate, a device of this type is referred to as a "twist release" hand brake control.

The rod 8 and pedal 7 are interconnected by a linkage system so that pressure on the pedal 7 not only actuates the brake, but also moves the rod 8 outwardly. When so moved, the mechanism 9 retains the rod 8 in the extended or brake applied position. The brakes are released by twisting the handle 6 to disengage the pawls contained within the release mechanism 9.

A rod 24 is pivotally connected at its upper end to the leg 26 of the U-shaped member 15. The lower end of rod 24 is pivotally connected at 27 to the forward end of a J-shaped arm 29. The arm 29 has a pair of aligned apertures that receive a pivot pin 32. A slot 35 is provided at the base of the arm 29 and a bolt 37 passes through the bight so that the part 29 may be secured to the shaft 33 in the same manner that member 15 is secured to the pivot shaft 12. The pivot pin 32 is rotatably mounted in bearings that are fixed in aligned apertures in the side plates 1 and 2.

The lower end of the lever 39 is fixed to the right-hand end of the pivot pin 32 on the right-hand side of the side plate 2 (see FIGURE 3). The upper end 40 of the lever 39 is provided with an elongated slot 44 and extends through upper and lower aligned slots 43 in the housing 10. A roller device 45 is centered within the slot 44 and is carried by a swivel fitting 42 screwed to the lower end of the rod 8.

In order to apply the mechanical brakes of a vehicle having an actuating device of the tape illustrated in FIGURE 1, the pad portion 46 of pedal 7 is depressed causing the pivot shaft 12 and the lever arms 21 of member 15 to rotate in a clockwise direction as seen in FIGURE 1. This movement will cause the Bowden cables 20 to be pulled upwardly which will apply the brakes. At the same time, lever arm 26 will also move upwardly causing the link 24 to impart a clockwise rotation to lever arm 29 which is secured to the lower pivot shaft 32. As a result the link 39 (also secured to shaft 32) is rotated in a clockwise direction so that its upper end 40 and the roller 45 journalled therein are moved to the right. The rod 8 will be pushed to an extended position where it will protrude into the operating or cab portion of the vehicle body. The releasable mechanism 9 will hold the shaft or rod 8 in the extended position and thus maintain the brakes in an applied condition. The brake is released by twisting the handle 6 about 90° and moving it forwardly. This action will release the tension on the Bowden cable 20 as a result of the transmission of motion through the interconnecting linkage.

The brakes may also be applied by pulling the handle 6 which will cause the lever 39 to rotate. The lever 39 will rotate the pivot pin 32 and the lever arm 29. This motion will be transmitted from the connecting link 24 through the U-shaped member 15 to the Bowden cable 20.

With the mechanism just described, the vehicle operator has a choice of applying the brakes by either pushing the pedal 46 with his foot or pulling the handle 6 with his hand. The brakes may be released gradually or slowly twisting the handle 6 and easing it forward.

The foregoing description presents the presently preferred embodiment of this invention. Modifications and alterations may occur to those skilled in the art that will come within the scope and the spirit of the following claims.

We claim:

1. A motor vehicle brake actuating system having a foot operated brake lever, a brake applying device, motion transfer means connected to said brake lever and to said brake applying device and adapted to actuate said device upon movement of said lever, a slidable brake control rod, link means interconnecting said rod and said motion transfer means and adapted to actuate said device upon movement of said rod, releasable means adapted to hold said rod in a brake applied position, said link means being adapted to move said rod to an actuated position when said lever is actuated.

2. A motor vehicle brake actuating system having a foot operated brake lever, a brake applying device, first motion transfer means connected to said brake lever and to said brake applying device and adapted to actuate said device upon movement of said lever, a hand operated member, second motion transfer means interconnecting said member and said first means and adapted to actuate said device upon movement of said member, releasable means adapted to hold said member in a brake applied position, said second means being adapted to move said member to an applied position when said lever is actuated.

3. A motor vehicle brake actuated system having a first actuator, a brake applying device, means connected to said first actuator and to said brake applying device and adapted to actuate said device upon movement of said first actuator, a second actuator, link means interconnecting said second actuator and said first mentioned means and adapted to actuate said device upon movement of said second actuator, releasable means adapted to hold said second actuator in a brake applied position, said link means being adapted to move said second actuator to an actuated position when said first actuator is actuated.

4. A motor vehicle brake actuating system having a foot operated brake lever, a brake applying device, means connected to said brake lever and to said brake applying device and adapted to actuate said device upon movement of said lever, a hand operated control, link means interconnecting said control and said first mentioned means and adapted to actuate said device upon movement of said control, said link means being adapted to move said control to an actuated position when said pedal is actuated.

5. An actuating system having a foot operated actuator, an actuatable control device, means connected to said foot operated actuator and to said control device and adapted to actuate said device upon movement of said foot operated actuator, a hand operated actuator, means interconnecting said hand operated actuator and said first mentioned means and adapted to actuate said device upon movement of said hand operated actuator, releasable means adapted to hold said hand operated actuator in an actuated position, said second mentioned means being adapted to move said hand operated actuator to an actuated position when said foot operated actuator is actuated.

6. An actuating system having a first actuating member movable from a first released position to a second applied position, an actuatable device, means connected to said first member and to said device and adapted to actuate said device when said first member is moved from its first position to its second position, a second actuating member movable from a first released position to a second applied position, means interconnecting said second member and said first mentioned means and adapted to actuate said device when said second member is moved from its first position to its second position, releasable means adapted to hold said second member in its second position, said second mentioned means being adapted to move said second member to its second position when said first member is moved to its second position.

References Cited by the Examiner

UNITED STATES PATENTS

| 2,504,729 | 4/1950 | Rajan | 74—481 |
| 2,792,083 | 5/1957 | Bourgue et al. | 74—481 X |
| 3,025,713 | 3/1962 | Koshaba et al. | 74—503 X |

MILTON KAUFMAN, *Primary Examiner.*